United States Patent [19]

Sullivan

[11] Patent Number: 4,815,849
[45] Date of Patent: Mar. 28, 1989

[54] SPECTROMETER USING CONCAVE HOLOGRAPHIC DIFFRACTION GRATING

[75] Inventor: James J. Sullivan, Newark, Del.

[73] Assignee: Hewlett-Packard Company, Palo Alto, Calif.

[21] Appl. No.: 139,884

[22] Filed: Dec. 30, 1987

[51] Int. Cl.$^4$ .............................................. G01J 3/18
[52] U.S. Cl. .................................................... 356/328
[58] Field of Search ............... 356/305, 326, 328, 331, 356/334

[56] References Cited

U.S. PATENT DOCUMENTS

| | | | |
|---|---|---|---|
| 4,087,183 | 5/1978 | Passereau | 356/305 |
| 4,279,511 | 7/1981 | Maute et al. | 356/328 |
| 4,568,187 | 2/1986 | Kita et al. | 356/328 |
| 4,623,251 | 11/1986 | Pouey | 356/328 |

OTHER PUBLICATIONS

Cordelle et al., "Aberration-Corrected Concave Gratings Made Holographically", *Optical Instruments and Techniques*, 1969, pp. 117–124 (Oriel Press, London).
H. Noda, et al., "Ray Tracing Through Holographic Gratings", *Journal of the Optical Society of America*, vol. 64, pp. 1037–1042, 1974.
W. McKinney, et al., "Numerical Design Method for Aberration-Reduced Concave Grating Spectrometers", *Applied Optics*, vol. 26, No. 15, 8/1/87.

*Primary Examiner*—F. L. Evans
*Attorney, Agent, or Firm*—Frank R. Perillo

[57] ABSTRACT

A spectrometer including a source of light, a slit member along the path of the light emitted from the source, a holographic, concave grating in the path of the light passing through the slit member, and a photodetector in the path of the diffracted light reflected from the grating. The photodetector is positioned substantially along the portion of the primary horizontal focal curve of the grating where it is intersected three times by a vertical focal curve of the grating. The three intersections being on the same side of the normal vector to the grating and two of the intersecting points being the positions of the laser used to form the grating.

9 Claims, 4 Drawing Sheets

SPECTROMETER USING CONCAVE HOLOGRAPHIC DIFFRACTION GRATING

FIELD OF THE INVENTION

The present invention relates to a spectrometer which uses a concave holographic diffraction grating to separate the light by wavelength. More particularly, the present invention relates to a spectrometer which uses a concave diffraction grating which provides the achievement of better focus, better luminosity and lower astigmatism over a wide range of wavelengths.

BACKGROUND OF THE INVENTION

Concave grating spectrometers separate light by wavelength so as to permit the measurement or recording of one or more of the wavelengths. In their simplest form they consist of an optical detector; a concave grating; and an entrance slit through which a beam of light is directed to the grating. The grating consist of a spherical reflective surface covered with a fine pattern of grooves, generally parallel and evenly spaced. The curved grating surface acts both to separate the wavelengths and to focus the light.

The focusing property of a concave grating is both good and bad. It is good in that it does not require auxiliary focusing devices, such as spherical mirrors, to focus the light on the detector of the spectrometer. This leads to low cost, instrument simplicity and, in the vacuum ultra-violet (UVU) wavelength region, avoidance of light loss mechanisms associated with the auxiliary devices. However, the bad part of a concave grating is that the design is so simple there are very few parameters that can be adjusted to compensate for various optical difficulties.

With the original type of concave gratings, which are made mechanically by scribing or ruling the grooves in a soft metal surface, a common limitation is astigmatism. This is the condition where the focal curve where the images of various wavelengths are narrowest, called the horizontal focal plane, is significantly different from the curve where the same images having minimum height, called the vertical focal plane. Astigmatism causes light losses, and increases the severity of several other aberrations. This problem is worse as the two focal curves are positioned further away from each other.

An improvement over mechanically ruled concave gratings is holographic gratings. Here, the grooves are made by means of an interference pattern formed with a coherent laser. A laser beam is split into two portions which are brought to a focus at two points. The light diverging from the two focal points is allowed to illuminate a spherical surface, coated with a photosensitive surface. Following exposure, the surface is chemically etched, and then coated with a reflective material. This process, having four parameters defining the locations of the two laser focal points, is more general than a mechanically ruled surface, which is only characterized by one parameter, the groove spacing.

A benefit of holographic gratings is that, by adjusting the locations of the laser focal points, the shape and size of the two focal curves can be modified. It was recognized very early that the horizontal focal curve can be made flatter, to better correspond to the nearly flat shape of the vertical focal curve, and that, to a certain extent, the two curves could be made to approach and even cross more than once. An advantage of these crossover points is that the astigmatism is zero for images formed here.

In the article "Aberration-Corrected Concave Gratings Made Holographically" by Cordelle et. al., published in the book OPTICAL INSTRUMENTS AND TECHNIQUES, 1969 (Oriel Press, London), pages 117–124, grating arrangements are described which have three crossings of the two focal curves. However, these designs suffer from some serious limitations. One of the three crossing points is used for the entrance slit, and so is unavailable as a image location. Also, there are only three possible locations for the laser focal points, greatly restricting the possible designs.

At least since the publication "Ray Tracing Through Holographic Gratings", by H. Noda et al, JOURNAL OF THE OPTICAL SOCIETY OF AMERICA, vol. 64, 1974, pages 1037–1042, which developed an exact ray-tracing procedure for concave holographic grating spectrometers, it has been known that, in principle, a computer program could be used to search all possibilities for the best optical design. This approach is limited by several well-known difficulties, such as premature termination of the search at a point representing a design which is locally optimal, but not the best overall design. An example of this approach is shown in a paper by Wayne R. McKinney et al, APPLIED OPTICS, vol. 26, August 1987, page 3108. It was their purpose to design a spectrometer of moderate resolution, with a flat focal plane of specified length, for a given wavelength range. They attempted to find the best design by means of computer-based optimization of the various optical parameters. However, this did not provide the most superior design for their purpose.

As shown in U.S. Pat. No. 4,279,511, there are cases with a concave grate spectrometer where it is advantageous to move a detector along a straight line, so that different wavelengths can be intercepted by the detector. In general, a concave grating, even a holographic grating, is not well suited for this, since the horizontal focal curve is not straight, leading to defocus errors. Additionally, the vertical focal curve, while nearly straight, is not in general disposed along the horizontal focal curve, leading to astigmatism errors. Therefore, it would be desirable to provide a concave grating spectrometer with a flat focal field, wide angular range, low astigmatism, high resolution and high optical throughput.

SUMMARY OF THE INVENTION

The present invention relates to a spectrometer of the type which includes a source of light, a holographic concave grating receiving the light from the source and a detecting means receiving the diffracted light from the grating. The improvement includes positioning the detecting means substantially along a path which is a portion of the horizontal focal curve of the grating which extends through the center of curvature of the grating and which is intersected at three points by a vertical focal curve of the grating. Two of the three points are the positions of the laser beams used to form the holographic grating. The three points are on the same side of the normal vector to the center of the grating.

DETAILED DESCRIPTION OF PREFERRED EMBODIMENT

Figure 1:
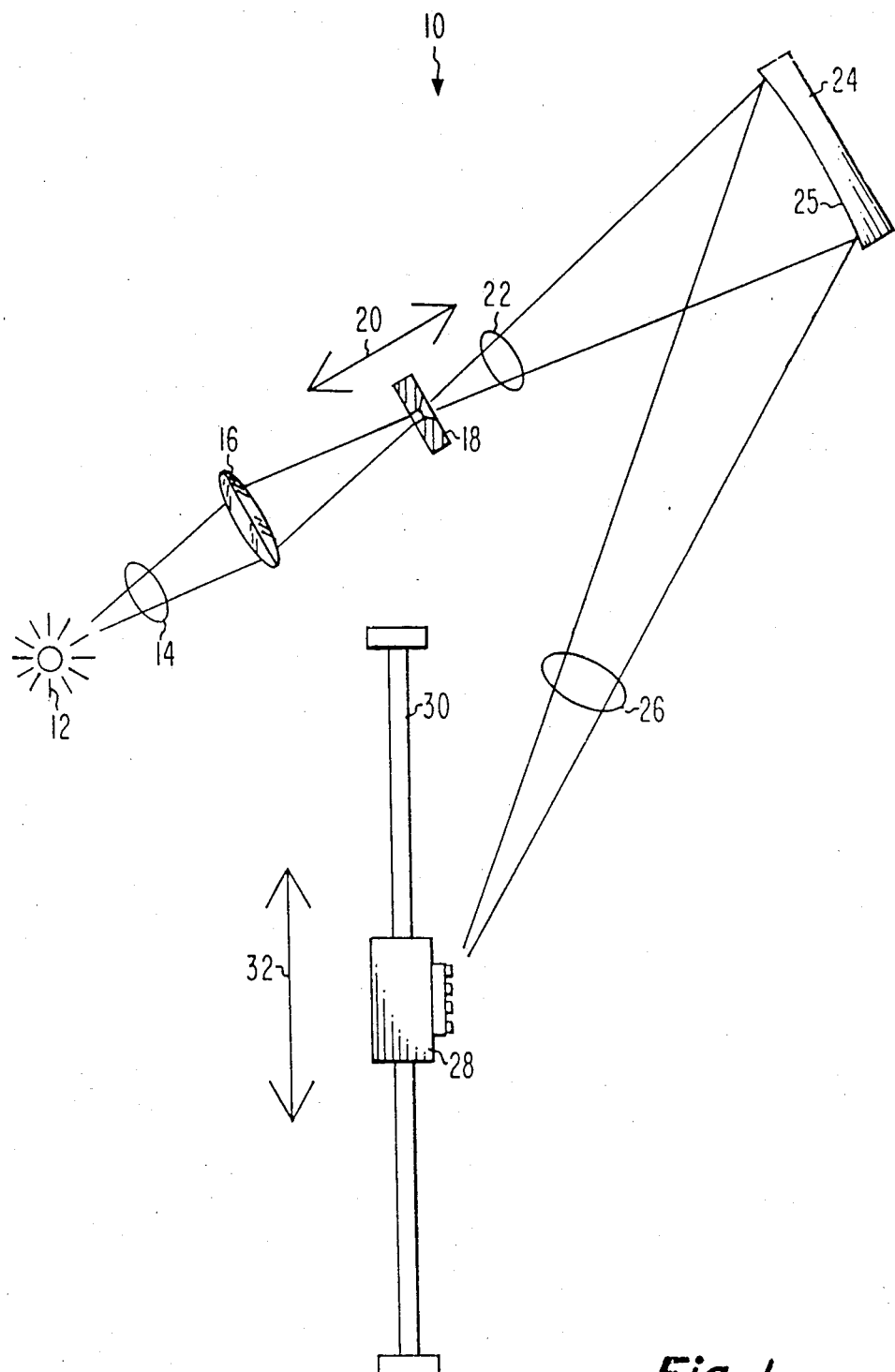
FIG. 1 is a schematic view of a form of the spectrometer of the present invention.

Referring initially to FIG. 1, a form of a spectrometer of the present invention is generally designated as 10. Spectrometer 10 includes a source of light 12, which may be a microwave cavity adapted to form a plasma containing a material to be measured. The light rays 14 from the light source 12 are directed through an optical device, such as a lens 16, to a slit member 18. The slit member 18 is movable along the path of the light as indicated by the arrow 20. The light rays 22 from the slit member 18 are directed to a holographic, concave grating 24. The diffracted light rays 26 reflecting from the concave surface 25 of the grating 24 are directed to a photodetector 28. As shown, the photodetector 28 is an array of photodetector elements, such as photodiodes. The photodetector 28 is mounted for movement along a plane 30 as indicated by the arrow 32.

The holographic, concave grating 24 is formed by the basic holographic technique well known in the art. This technique includes coating the concave surface of a grating substrate with a layer of a photoresist. The photoresist layer is then placed at the intersection of two laser beams emanating from two spaced lasers. This produces an interference pattern in the photoresist. After the photoresist is developed the interference pattern is etched into the surface of the substrate. The surface is then coated with a reflective material, such as aluminum.

I have discovered that an improved spectrometer having the desired characteristics previously set forth can be made if the following constraints are satisfied:

1. A horizontal focal curve of the grating passes through the center of curvature of the concave surface of the grating. This focal curve will be referred to as the "primary horizontal focal curve".
2. The laser focal points lie on the same horizontal focal curve.
3. A first vertical focal curve intercepts both laser focal curves, and also intercepts the horizontal focal curve at a third point. The three intercepts all lie on the same side of the grating normal.
4. A second vertical focal curve consists of all of the vertically focused images of all points on the first vertical focal curve.
5. The location of the source point is determined by the intercept of the second vertical focal curve and the horizontal focal curve. The source point lies on the opposite side of the grating normal form the laser focal points.
6. The image focal curve lies along the horizontal focal curve, on the same side of the grating normal as the laser points.

Figure 2:
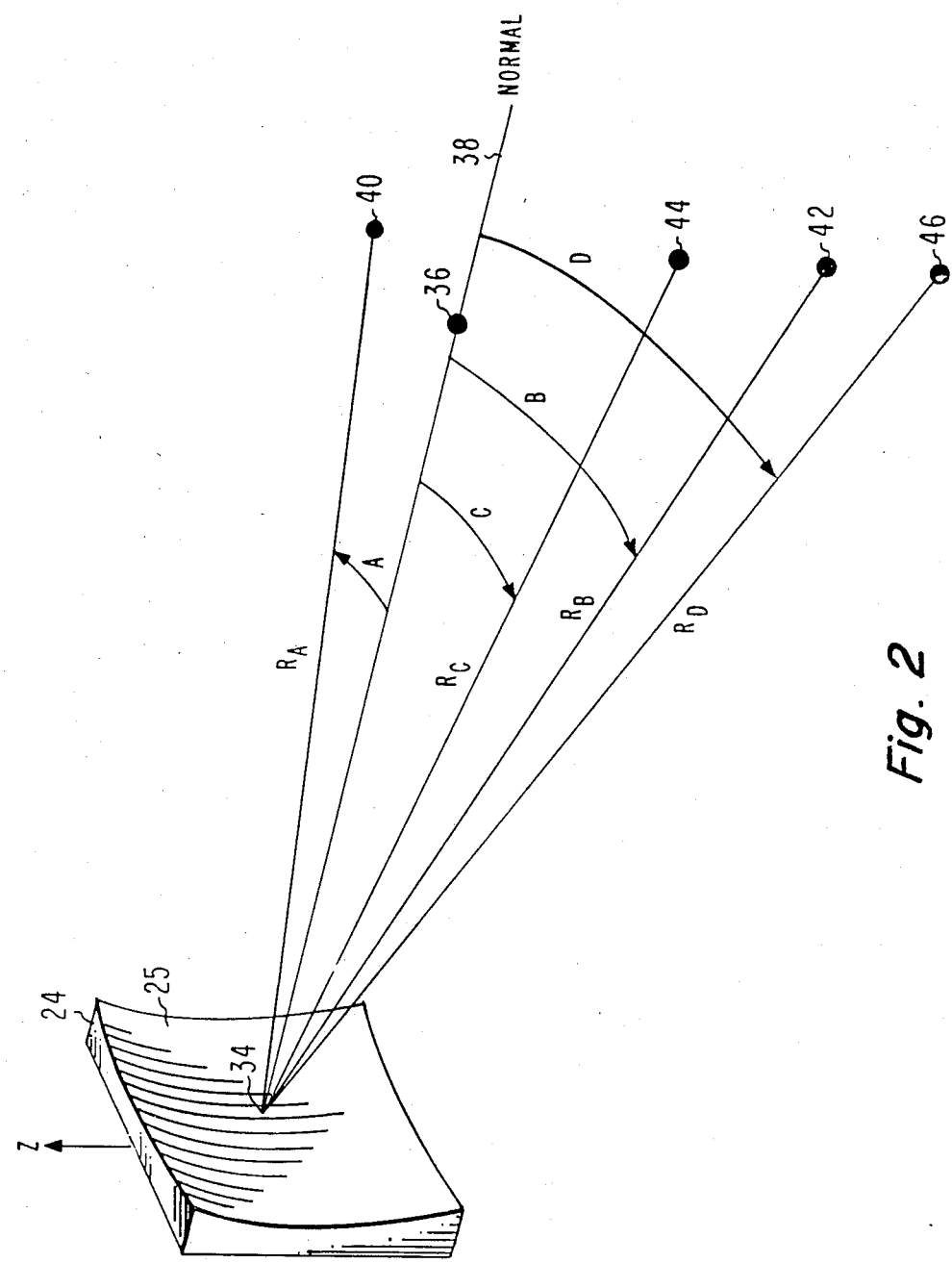
FIG. 2 is perspective view of a concave grating showing its coordinate system.

In describing concave holographic spectrometers, it is convenient to use polar coordinates (Rx, X). FIG. 2 shows the center 34 of a coordinate system centered on the face 25 of the concave holographic diffraction grating 24. Radial distances from the center 34 are normalized by the distance from the center 34 to the center of curvature 36 of the face 25, and are identified by a multi-letter symbol beginning with "R". Angles are labeled with uppercase letters and are measured from the grating normal 38. The grating normal 38 is a line from the center 34 through the center of curvature 36. The plane of the coordinate system includes the center 34 and is perpendicular to the vector Z, which is collinear with the direction of the grooves at the center of the grating.

A concave holographic grating can be described by relations between the source point 40 located at the polar coordinates (Ra, A) and, at some wavelength L, the image point 42 located at (Rb, B). The properties of the grating ar also determined by the location of the two laser focal points 44 and 46 which are used in making the grating surface. The first laser focal point 44 is located at (Rc, C), and the second laser focal point 46 is located at (Rd, D). Angles B, C and D are positive, while angle A is negative.

The spectrometer can be described by the following equations:

$$\sin D - \sin C = L_o/d \quad (1)$$

$$\sin A + \sin B = L/d \quad (2)$$

$$O = \frac{\cos^2 x}{Rx} - \cos x - H\sin x \quad (3)$$

$$K = \frac{1}{Rx} - \cos x - V\sin x \quad (4)$$

Equation (1) shows how groove spacing, d, is determined by the two laser angles, C and D, and the laser wavelength, $L_o$. Equation (2) gives the relation between the angles A and B to the source and image, and the groove spacing, d, and the wavelength L. Equation (3) defines a horizontal focal curve through the center of curvature and some general point (Rx, X), in terms of the parameter H. According to the present invention, the coordinates for the source, one image point, and both laser points (A, Ra), (B, Rb), (C, Rc) and (D, Rd), respectively, all satisfy equation (3) with a common value of the parameter H. Equation (4) defines a vertical focal curve through some general point (Rx, X) in terms of the two parameters K and V. According to the present invention, the coordinates for one image point and both laser points each satisfy equation (4) with common values of K and V. The coordinates for the source, however, satisfy equation (4) with the same value of V and the same magnitude of K but with K opposite in sign. Equation (4), with a change of sign for K, describes a vertical focal curve which is the vertically focussed image of the curve with the original sign for K.

Figure 3:
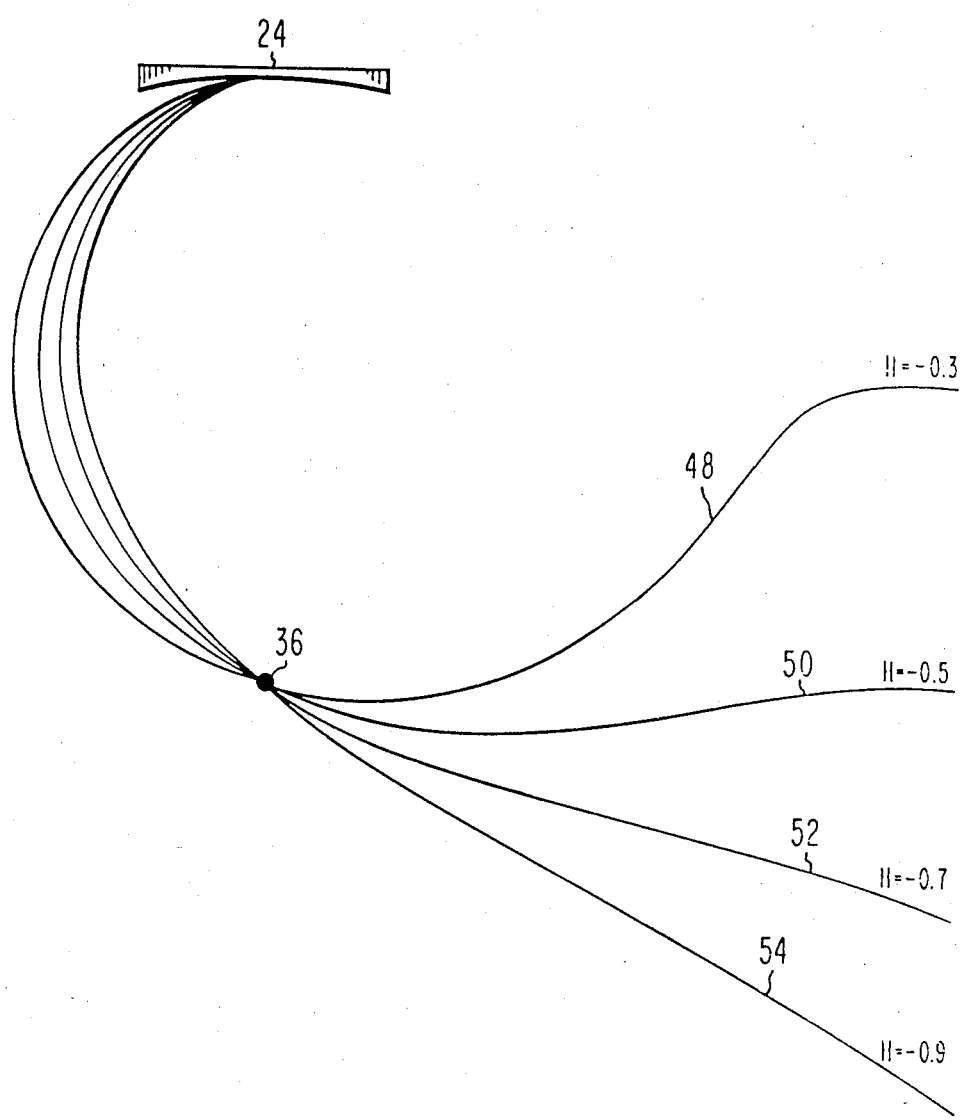
FIG. 3 is a view showing the horizontal focal curves of a concave grating.

FIG. 3 shows the plane of the coordinate system, including the grating 24. Four horizontal focal curves, 48, 50, 52 and 54, in the form of equation (3), are shown. All horizontal focal curves satisfying equation (3) begin at the grating 24 and intercept the center of curvature 36. The curves 48, 50, 52 and 54 correspond to the values of H of $-0.3$, $-0.5$, $-0.7$ and $-0.9$ respectively. It can be seen from FIG. 3 that larger magnitudes of H give flatter focal curves, but more oblique curves.

The vertical focal curves are nearly straight lines. In fact the curves that intercept the center of curvature are exactly straight. By varying the parameters V and K, a vertical focal curve can be tilted and offset from the center of curvature.

Since one object is to design flat focal plane spectrometers, it is useful to know where the inflection point of the focal curve is, since that is where the focal plane is flattest. This point is specified by the following pair of equations:

$$Rb = 3/2 (\cos B) \text{ and } \tan B = -1/(3H) \tag{5}$$

The following is a summary of the spectrometer design process. Based on the known geometry of the source and detector, and the desired wavelength resolution, the radius of curvature of the grating is chosen. Based on the desired wavelength range, an approximate value is chosen for the angular range spanning the image plane. Angular ranges as large as 30 degrees have been found practical with the present invention. For this step, an approximate value of the source angle of zero degrees from the grating normal is used. From the chosen angular range, the groove spacing, d, can be calculated from equation (1). A value of the parameter H is chosen. There is a tradeoff between having constant magnification and dispersion at lower values of H, such as $-0.3$, and having a flatter focal curve at high values of H, such as $-0.9$.

Once H is chosen, so that the image horizontal focal curve is known, the two laser angles, C and D, are chosen. This choice is constrained by equation (1) and the chosen value of the groove spacing, d. The positions of the two laser points, which are also stigmatic points on the horizontal focal curve, as well as a third stigmatic point, are chosen so that they overlie the working part of the horizontal focal curve, i.e., the section of the curve that will contain the images at the wavelengths of interest. It is preferred that the working part of the horizontal focal curve be centered on the point of inflection, as given in equation (5).

At this point all of the parameters of the spectrometer are determined, and the position of the source point can be calculated. Now the process is repeated, using the calculated value of the source angle instead of the approximate one.

EXAMPLE

As an example, consider the design process for a spectrometer with a 300 mm radius of curvature. It is intended for the wavelength range from 200 to 800 mn. For good dispersion, 25 degrees is initially chosen for the angular range of the image plane. With the initial assumption that the entrance slit is located at 0 degrees, the groove spacing is calculated to be near 1900 nm. A value of $-0.7$ is selected for H, based on a compromise of image field flatness with obliqueness.

The two laser points are chosen to bracket the angle in the inflection point, which equation (5) gives as 25.46 degrees. The angle to one laser focal point is chosen as 29 degrees. For a laser wavelength of 488 nm, equation (1) gives the second laser angle of 13.18 degrees. Equation (3) gives the normalized radial dimensions of the laser points as 1.429 for the first point and 1.165 for the second. Simultaneous solution of equation (4) for the two points gives values of $-0.2336$ for V and $-0.0641$ for K. The equations also yield the location of the source point as 0.9228 ($-6.288$ degrees). Now it is found that the stigmatic points are located in the image plane at wavelengths of 225 nm and 713 nm. There is a third stigmatic point at an intermediate point.

This design can be evaluated by ray tracing. For a 75 nm diameter grating, for wavelengths from 200 to 800 nm, images of a point source have spectral widths measured as standard deviations ranging from 0.062 to 071 m. For a 50 nm diameter grating, the aberrations are even smaller, so that the image standard deviations average 0.028 nm.

I have found that certain small deviations from the above constraints still result in a useful spectrometer design. For instance, the horizontal focal curve can be modified to come no closer to the center of curvature than 5 percent of the distance from the grating to the center of curvature. In another example, the vertical focal curve intercepting the two laser points on the horizontal focal curve can differ from the vertical focal curve that is in vertical focus with the source point by up to a 0.03 difference in the parameter K, with the same value of the parameter V. These deviations are insignificant with regard to the present invention.

Figure 5:
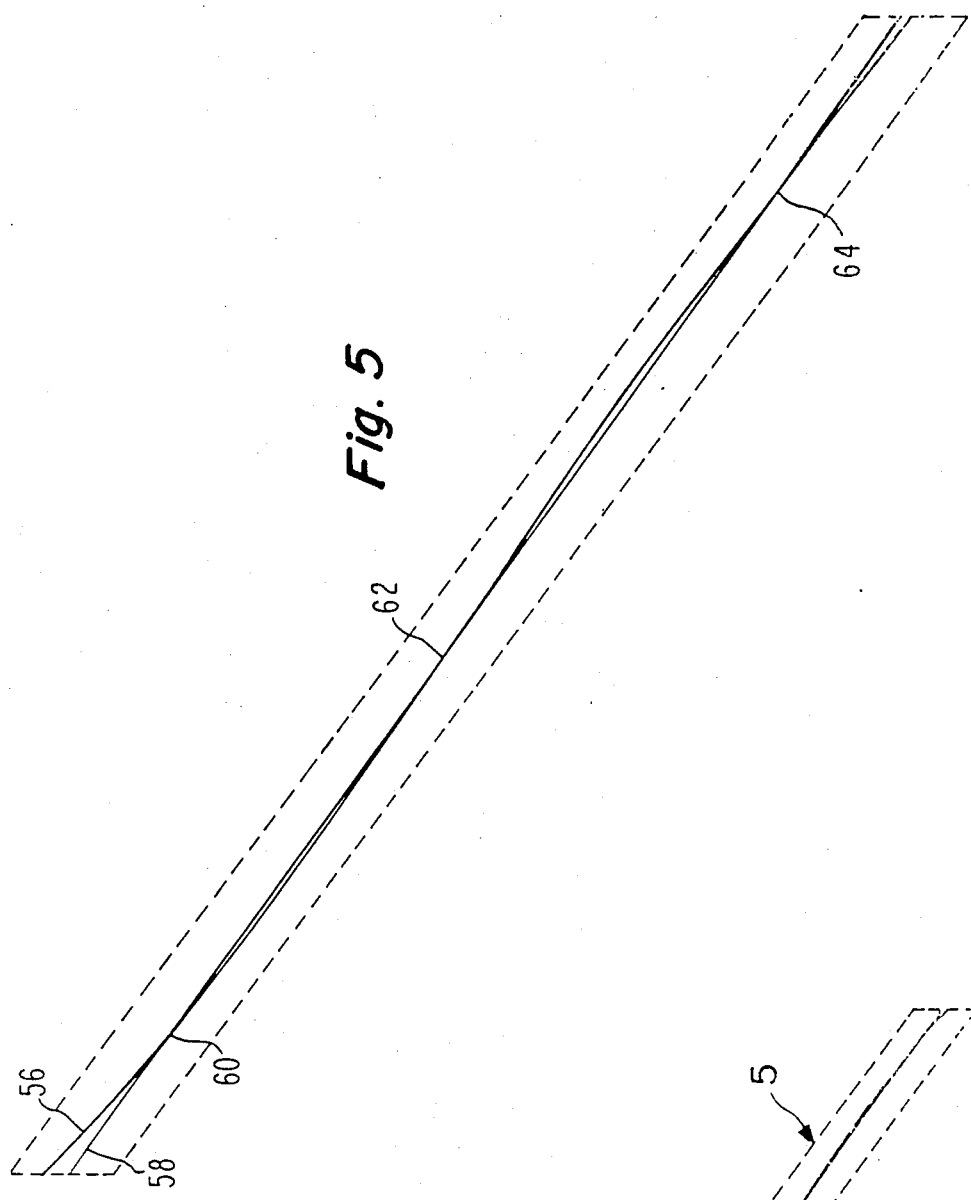
FIG. 5 is an enlarged view of the portion of the focal curves where the detectors are positioned.
Figure 4:
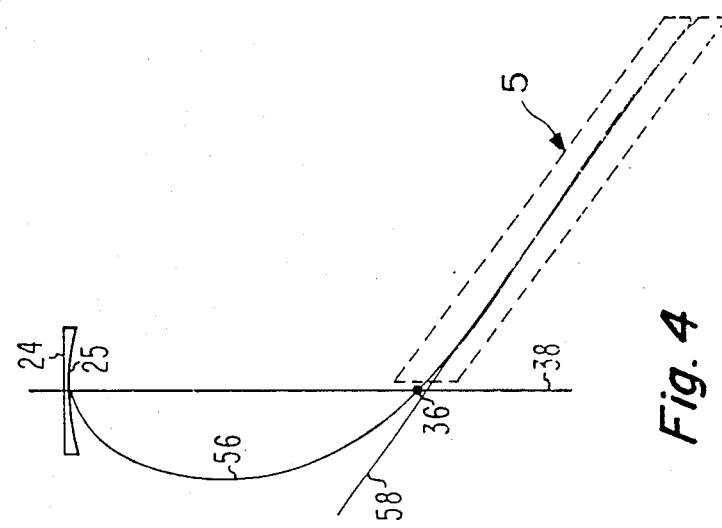
FIG. 4 is a view showing the primary horizontal focal curve and a vertical focal curve of the grating.

To make the grating 24 of the present invention, the two lasers are positioned along the horizontal focal curve which passes substantially through the center of curvature of the concave surface of the grating 24, which is the primary horizontal focal curve. Referring to FIG. 4, the center of curvature of the concave surface 25 of the grating 24 is the point 36. The primary horizontal focal curve is the curve 56. In addition the two lasers are positioned along the portion of the primary horizontal focal curve 56 where a vertical focal curve 58 crosses the primary horizontal focal curve at least three points with the three points being on the same side of the normal vector to the center of the concave surface 25 as indicated by line 38. The three points should be on the side of the normal vector 438 where the horizontal focal curve is furtherest from the grating. As shown in FIG. 5, which is an enlarged showing of a portion of the curves shown in FIG. 4, the three points that the vertical focal curve 38 cross the primary horizontal focal curve 36 are indicated at 60, 62, and 64. In making the grating 24, the two lasers are positioned on two of the crossing points, preferably the outer two points 60 and 64.

In using the holographic, concave grating 24 in the spectrometer 10, the plane 30 along which the photodetector 28 is mounted is positioned so that it intersects the three intersecting points 60, 62 and 64 of the primary horizontal focal curve 56 and the vertical focal curve 58. In this position of the plane 30, the photodetector 28 is horizontally focused with respect to the light 26 reflected from the grating 24. Also, as can be seen in FIGS. 4 and 5, in this region of the primary horizontal focal curve 56, the vertical focal curve 58 is very close to the horizontal focal curve 56 so that the astigmatism is very small. However, in the spectrometer 10, the astigmatism can be made smaller by moving the slit member 18 toward or away from the grating 24 in the direction of the arrow 20. This movement of the slit element 18 moves the vertical focal curve 58 toward or away from the primary horizontal focal curve 56. Thus, the vertical focal curve 58 can be moved to be very close to the primary horizontal focal curve 58 so as to minimize or eliminate any astigmatism between the focal curves 56 and 58. This places the photodetector 28 in substantially exact focus with the spectrum provided from the light source 12.

Since the vertical focal curve 58 is so close to the primary horizontal focal curve 56 in the region of the three intersecting points 60, 62 and 64, only slight movements of the slit member 18 is necessary to achieve focus. There are various known methods for measuring the intensity of the light on the elements of the photodetector 28 to determine when it is in focus. One suitable technique is described in m co-pending application for U.S. Pat. Ser. No. 139,509 filed Dec. 30, 1987, entitled APPARATUS AND METHOD FOR ADJUSTING FOCUS OF A MULTI-ELEMENT OPTICAL DETECTOR, which is incorporated herein by reference. In the method described in this application, the second difference of the output of three of the elements of the photodetector 28 is determined at each position of the slit member 18, and the position which has the highest value of the second difference is the focus position. Thus, it is relatively easy to focus the photodetector 28.

The photodetector 28 can be moved along the plane 30 in the region of the intersecting points 60, 62 and 64 to detect different wavelengths diffracted by the grating 24 and each wavelength will be in focus. Instead of using a single photodetector 28 movable along the focal curves, a series of photodetectors can be mounted along the primary horizontal focal curve 56 in the region of the intersecting points 60, 62 and 64. However, in practice it is difficult to mount the photodectectors exactly along the primary horizontal focal curve and provide means for obtaining signals from all of the photodetectors. Therefore, it is preferred to use a single photodetector array 28 which is movable along the plane 30.

Thus, there is provided by the present invention a spectrometer 10 having a holographic, concave grating 24 which provides for ease of placing the photodetector 28 in focus with the light from the light source 12. Also, the spectrometer 10 provides for high light level and high resolution over a wide range of wavelengths. Since the spectrometer 10 uses a concave grating 24 and the focus is achieved by merely moving the slit member 18 over a small distance, the spectrometer is compact in size. By being able to use a multi-element photodetector which is movable along a plane, it can take measurements over a wide range of wavelengths while still maintaining the detector element in focus.

I claim:

1. In a spectrometer having a source of light, a holographic concave grating receiving said light, and a detecting means receiving the diffracted light from the grating, the improvement comprising:

said detecting means being positioned substantially along a path which is a portion of the horizontal focal curve of the grating which extends through the center of curvature of the grating and which is intersected at three points by a vertical focal curve of the grating two of said points being the positions of the two lasers used to form the holographic grating, and said three points being on the same side of the normal vector to the center of the grating.

2. A spectrometer in accordance with claim 1 including a slit member in the light path between the light source and the grating.

3. A spectrometer in accordance with claim 2 wherein the slit is positioned on the horizontal focal curve, on the side of the normal vector opposite from the side containing the three points so that the slit is in vertical focus at the three points.

4. A spectrometer in accordance with claim 3 wherein the slit member is movable along the light path toward and away from the grating.

5. A spectrometer in accordance with claim 4 wherein the three points are on the side of the normal vector where the horizontal focal curve is furtherest from the grating.

6. A spectrometer in accordance with claim 5 wherein the detecting means is a photodetector.

7. A spectrometer in accordance with claim 5 wherein the detecting means is a plurality of photodetector elements positioned along said portion of the horizontal focal curve.

8. A spectrometer in accordance with claim 5 wherein the photodetector is a multi-element photodetector mounted along a plane which extends through the three points.

9. A spectrometer in accordance with claim 8 wherein the photodetector is movable along said plane so as to detect a wide range of wavelengths from the grating.

* * * * *